US011922249B2

United States Patent
Escaro

(10) Patent No.: US 11,922,249 B2
(45) Date of Patent: Mar. 5, 2024

(54) RFID LABEL AND RFID TAG

(71) Applicant: SATO HOLDINGS KABUSHIKI KAISHA, Tokyo (JP)

(72) Inventor: Rodly Escaro, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 17/417,874

(22) PCT Filed: Sep. 18, 2019

(86) PCT No.: PCT/JP2019/036641
§ 371 (c)(1),
(2) Date: Jun. 24, 2021

(87) PCT Pub. No.: WO2020/137035
PCT Pub. Date: Jul. 2, 2020

(65) Prior Publication Data
US 2022/0076093 A1 Mar. 10, 2022

(30) Foreign Application Priority Data
Dec. 28, 2018 (JP) .................. 2018-248103

(51) Int. Cl.
G06K 19/077 (2006.01)
G06K 19/07 (2006.01)
(Continued)

(52) U.S. Cl.
CPC ... *G06K 19/07786* (2013.01); *G06K 19/0723* (2013.01); *G06K 19/0776* (2013.01); *H01Q 1/2208* (2013.01); *H01Q 9/285* (2013.01)

(58) Field of Classification Search
None
See application file for complete search history.

(56) References Cited

U.S. PATENT DOCUMENTS 9,594,992 B1   3/2017 Lai
2005/0012616 A1*  1/2005 Forster ............ G06K 19/07749
340/572.7
(Continued)

FOREIGN PATENT DOCUMENTS

JP   2008134867 A  *  6/2008
JP   2009-069936 A     4/2009
(Continued)

OTHER PUBLICATIONS

Extended European Search Report, application No. 19902431.6, dated Feb. 9, 2022, 10 pages.

*Primary Examiner* — Fekadeselassie Girma
(74) *Attorney, Agent, or Firm* — Foley & Lardner LLP

(57) ABSTRACT

An RFID label includes: a substrate; a dipole antenna formed of a metal foil so as to have a predetermined antenna length and a predetermined antenna width, the dipole antenna being arranged on a surface of the substrate; an IC chip connected to the dipole antenna; and a separator temporarily adhered to an adhesive agent overlaid on the surface of the substrate on which the dipole antenna is arranged, wherein a tear off line cuts through the substrate and the dipole antenna, in at least a part of the dipole antenna, so as to extend along an antenna length direction and so as to be superimposed with the part of the dipole antenna.

4 Claims, 5 Drawing Sheets

(51) Int. Cl.
*H01Q 1/22* (2006.01)
*H01Q 9/28* (2006.01)

(56) References Cited

U.S. PATENT DOCUMENTS

| | | | | |
|---|---|---|---|---|
| 2006/0017545 A1* | 1/2006 | Volpi | ............... | G06K 19/0739 |
| | | | | 340/10.4 |
| 2006/0132313 A1* | 6/2006 | Moskowitz | ...... | G06K 19/07345 |
| | | | | 343/750 |
| 2007/0115129 A1* | 5/2007 | Kessler | ............ | G06K 19/07345 |
| | | | | 340/572.3 |
| 2007/0146142 A1* | 6/2007 | Cote | ............... | G06K 19/07749 |
| | | | | 340/572.5 |
| 2013/0306741 A1* | 11/2013 | Hino | ............... | G06K 19/07749 |
| | | | | 235/492 |
| 2014/0263659 A1* | 9/2014 | Kervinen | ......... | G06K 19/07381 |
| | | | | 235/488 |
| 2016/0172742 A1* | 6/2016 | Forster | .............. | G08B 13/2428 |
| | | | | 343/878 |

FOREIGN PATENT DOCUMENTS

JP  2009-070323 A  4/2009
JP  2010-205164 A  9/2010

\* cited by examiner

RFID LABEL AND RFID TAG

TECHNICAL FIELD

The present invention relates to an RFID label and an RFID tag.

BACKGROUND ART

In the field of manufacture, management, logistics, and so forth of products, tags that are attached to the products and labels that are affixed to the products, etc. are used. Information related to the products is printed on the tags and the labels so as to be visually visible. In recent years, a technique utilizing an RFID (Radio Frequency Identification), in which identification information written on an IC chip is transmitted and received via a wireless communication, is becoming more and more common in various fields, and the technique is also becoming more familiar in the above-described fields.

There are RFID media such as the tags, the labels, and so forth into which RFID inlays are integrated. The RFID inlay is formed by overlaying the IC chip with such an RFID specification and a line shaped antenna pattern on a substrate. Information related to a target object to which the RFID medium is attached or affixed is printed on the RFID medium so as to be visually visible. In addition, various information related to the target object can be stored in the IC chip assembled into the RFID medium.

As the RFID medium, there is the RFID medium having a tear off line formed by a so called perforation processing such that a part of the medium can be separated away. In the tear off line, slit portions having a predetermined length and portions without slits having a predetermined length are repeated alternately. A user can easily tear off the part of the RFID medium at the tear off line. In the following, the slit portions are referred to as cut portions, and the portions without slits are referred to as uncut portions.

An example of applications of the RFID medium with the tear off line includes the application to an product item for a gift. In such an application, by printing the information, such as price, etc., that the user normally wish to hide from a recipient on a separable portion that can be separated away at the tear off line of the RFID medium, the separable portion can be separated away after the product item has been purchased.

JP2009-069936A discloses a label provided with a perforated line.

SUMMARY OF INVENTION

With the above-described RFID medium formed with the tear off line, if the tear off line is formed so as to intersect with an antenna pattern, there is a risk in that the antenna pattern is cut off. Therefore, it is required to arrange the antenna pattern in the label such that the tear off line does not intersect with the antenna. The size and the length of the antenna pattern are related to a communication range of the antenna. Thus, as the length of the antenna pattern is shortened, the communication range of the antenna is also reduced, and as a result, a deterioration of an antenna performance is caused.

An object of the present invention is to provide an RFID label and an RFID tag a part of which is separated at a tear off line, the RFID label and the RFID tag being capable of maintaining an antenna performance even if the tear off line and an antenna pattern intersect with each other.

According to one aspect of the present invention, provided is an RFID label having a part separable by a tear off line, the RFID label including: substrate; a dipole antenna formed of a metal foil so as to have a predetermined antenna length and a predetermined antenna width, the dipole antenna being arranged on a surface of the substrate; an IC chip connected to the dipole antenna; and a separator temporarily adhered to an adhesive agent overlaid on the surface of the substrate on which the dipole antenna is arranged, wherein the tear off line cuts through the substrate and the dipole antenna, in at least a part of the dipole antenna, so as to extend along an antenna length direction and so as to be superimposed with the part of the dipole antenna.

In addition, according to another aspect of the present invention, provided is an RFID tag having a part separable by a tear off line, the RFID tag comprising: a substrate; a dipole antenna formed of a metal foil so as to have a predetermined antenna length and a predetermined antenna width, the dipole antenna being arranged on a surface of the substrate; an IC chip connected to the dipole antenna; and a support substrate overlaid on the surface of the substrate on which the dipole antenna and the IC chip are arranged via a bonding agent, wherein the tear off line cuts through the substrate, the support substrate, and the dipole antenna, in at least a part of the dipole antenna, so as to extend along an antenna length direction and so as to be superimposed with the part of the dipole antenna.

In the one aspect of the present invention, the tear off line is formed in the part of the dipole antenna having a wide width so as to extend along the antenna length direction of the part and so as to be superimposed with the part. Even if the tear off line and the dipole antenna are superimposed by forming the tear off line at the above-described position, the dipole antenna is prevented from being cut completely, and therefore, the arrangement and the size of the antenna pattern have less restriction, and so, it is possible to maintain the antenna performance.

DESCRIPTION OF EMBODIMENTS

[RFID Label and RFID Tag]

First Embodiment

An RFID label 100 according to a first embodiment of the present invention will be described.

Figure 1:
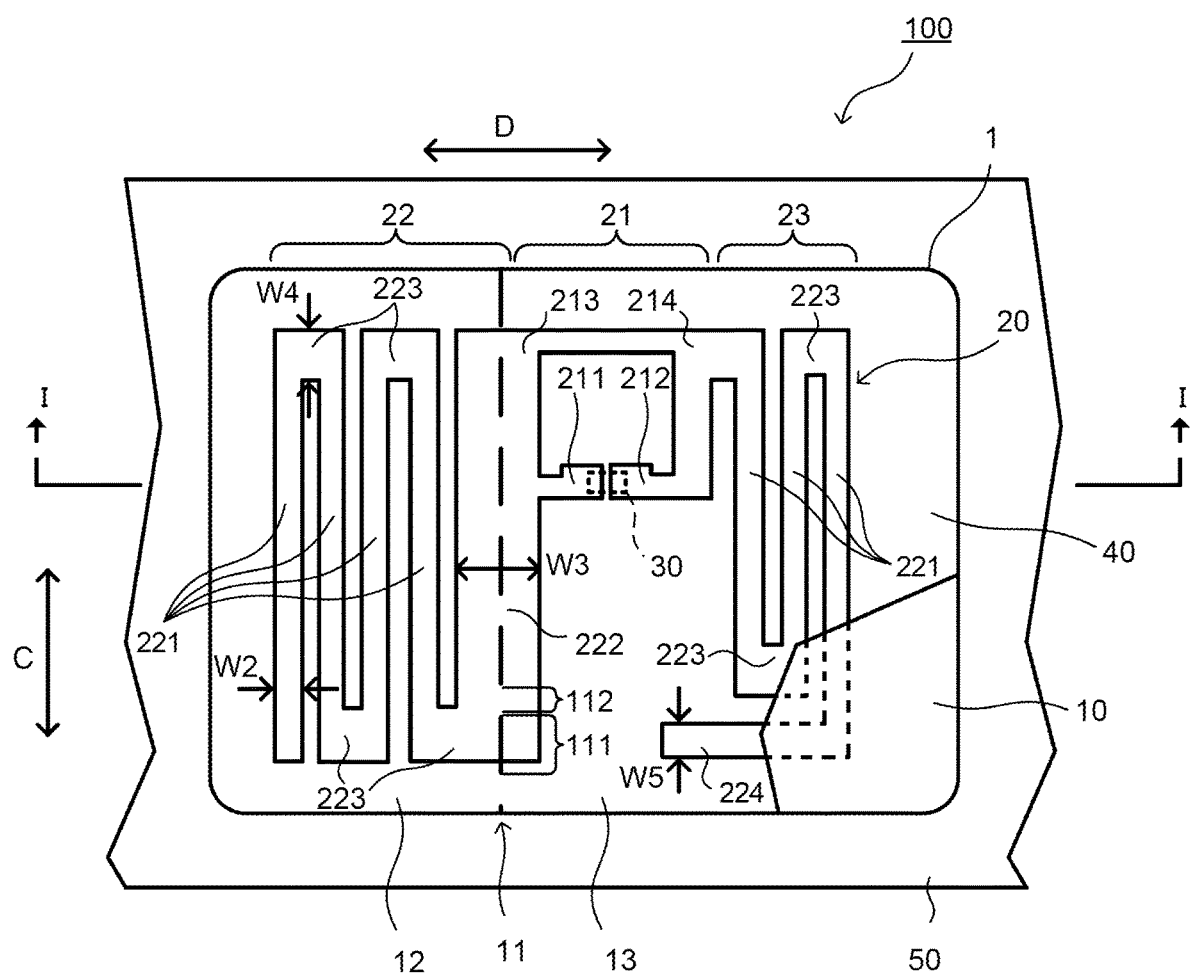
FIG. 1 is a schematic plan view showing an RFID label according to a first embodiment of the present invention with a part thereof cut out.
Figure 2:
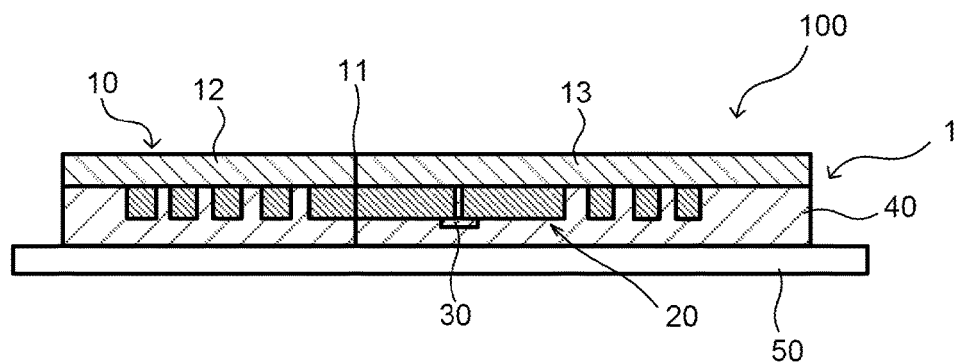
FIG. 2 is a sectional view taken along a line I-I shown in the RFID label according to the first embodiment of the present invention.

FIG. 1 is a schematic plan view showing the RFID label 100 according to the first embodiment with a part thereof cut out, and FIG. 2 is a sectional view taken along a line I-I shown in the RFID label 100 according to the first embodiment of the present invention.

The RFID label 100 is provided with an RFID inlay 1, an adhesive agent 40 that is overlaid on the RFID inlay 1, and a separator 50 that is temporarily adhered to the adhesive agent 40, and the RFID label 100 is the label that can be separated along a tear off line 11.

In this embodiment, the RFID inlay is formed by joining an IC chip having an RFID specification to an antenna pattern that is formed on a surface of a substrate (such as a paper, a film, and so forth) with an anisotropically conductive paste.

In this embodiment, the antenna pattern is a dipole antenna pattern.

The RFID inlay 1 has a substrate 10 a dipole antenna 20 that is formed of a metal foil so as to have a predetermined antenna length and a predetermined antenna width the dipole antenna 20 being arranged over both sides of the tear off line 11 on the substrate 10 and an IC chip 30 connected to the dipole antenna 20.

In this embodiment, as shown in FIGS. 1 to 7, the direction in which the tear off line 11 for separating a part of the RFID label 100 extends is illustrated as the C direction of the RFID label 100, and the direction intersecting with the tear off line 11 is illustrated as the D direction of the RFID label 100.

The substrate 10 can be separated into a first substrate portion 12 and a second substrate portion 13 at the tear off line 11 as the boundary.

In this embodiment, as shown in FIG. 1, the tear off line 11 is formed by a so called perforation processing and is illustrated with alternately repeating cut portions 111, which are shown by the solid lines, and uncut portions 112, which are shown between the solid lines. The cut portions 111 and uncut portions 112 are each formed to have a predetermined length. The position at which the tear off line 11 is formed in the substrate 10 will be described later.

In this embodiment, a material that can be applied as the substrate 10 includes papers such as fine quality paper, coated paper, and so forth. The thickness of the substrate 10 is preferably from 16 μm to 350 μm, inclusive, and generally, it is preferably from 25 μm to 260 μm, inclusive.

The dipole antenna 20 formed of the metal foil is overlaid on the surface of the substrate 10 via a bonding agent (not illustrated). The dipole antenna 20 is formed to have a predetermined antenna length and a predetermined antenna width and is arranged so as to spread over the first substrate portion 12 and the second substrate portion 13 on both sides of the tear off line 11.

In this embodiment, the antenna length means the length in the long-side direction of respective parts forming the dipole antenna 20. In addition, as shown in FIG. 1, the antenna width means widths W2 to W5 at respective parts forming the dipole antenna 20. The respective parts forming the dipole antenna 20 will be described below in the description of the dipole antenna 20. In addition, the positional relationship between the tear off line 11 and the dipole antenna 20 will be described below in the description of the dipole antenna 20.

In this embodiment, as a metal forming the metal foil used to form the dipole antenna 20, an electrically conductive metal generally used for forming the antenna pattern can be applied. One example thereof includes copper and aluminum. In view of suppressing the manufacturing cost, it is preferable to use aluminum. In addition, it is preferable that a thickness of the metal foil be from 3 μm to 25 μm, inclusive. It is further preferable to use an aluminum foil having the thickness of 20 μm.

The adhesive agent 40 is overlaid at least on the surface of the second substrate portion 13 on the one side of the tear off line 11 on the substrate 10 where the dipole antenna 20 is arranged. In addition, the separator 50 is formed so as to be larger than the RFID label 100. The separator 50 is temporarily adhered to the RFID inlay 1 via the adhesive agent 40.

In this embodiment, examples of the adhesive agent 40 include adhesive agents such as acrylic adhesive agents, urethane adhesive agents, silicone adhesive agents, rubber adhesive agents, and so forth. In this embodiment, the adhesive agent 40 is overlaid not only on the surface of the second substrate portion 13 where the dipole antenna 20 is arranged, but also over the surface of the first substrate portion 12 where the dipole antenna 20 is arranged, as shown in FIG. 2.

In this embodiment, general-purpose products may be used as the separator 50.

Next, the configuration of the dipole antenna 20, and the positional relationship between the dipole antenna 20 and the tear off line 11 will be described.

The dipole antenna 20 has a loop portion 21 having IC-chip connecting portions 211 and 212 to which the IC chip 30 is connected and a pair of meanders 22 and 23 extending out from the loop portion 21. The IC chip 30 is joined to the IC-chip connecting portions 211 and 212.

The loop portion 21 is formed to have a rectangular shape, has the IC-chip connecting portions 211 and 212, and has end portions 213 and 214 each connected to one end portion of each of the pair of meanders 22 and 23, which will be described below.

As shown in FIG. 1, the meanders 22 and 23 are each formed to have, as a whole, a shape extending in the D direction in zigzag from each of the end portions 213 and 214 of the loop portion 21 by taking the C direction as the meandering width direction.

The meanders 22 and 23 have a plurality of long-path portions 221 extending in the C direction and short-path portions 223 extending in the D direction, the meander 22 has a long-path portion 222 extending in the C direction and having a width wider than those of the plurality of long-path portions 221, and the meander 23 has a middle-path portion 224 extending in the D direction. In each of the meanders 22 and 23, respective end portions of the long-path portions 221 and 222, the short-path portions 223, the middle-path portion 224 are connected in the perpendicular direction.

In the meanders 22 and 23, the width of the long-path portions 221 is expressed as W2, and the width of the long-path portion 222 is expressed as W3. In addition, the width of the short-path portions 223 is expressed as W4, and the width of the middle-path portion 224 is expressed as W5.

The width W2 of the long-path portions 221, the width W4 of the short-path portions 223, and the width W5 of the middle-path portion 224 are set so as to have a predetermined length by taking an antenna radiation efficiency into consideration.

The long-path portion 222 is formed to have the width W3 that is wider than the widths W2, W4, and W5 of the other parts of the meanders 22 and 23, and the tear off line cuts through (penetrates through) the substrate 10 and the dipole antenna 20 at the position superimposed with the long-path portion 222.

The lengths of the meanders 22 and 23 (the total length of the long-path portions 221 and 222, the short-path portions 223, and the middle-path portion 224), the number of folded portions (the number of the long-path portions 221 and 222, the short-path portions 223, and the middle-path portion 224), and the curvature radius of curved portions are set by taking the antenna radiation efficiency into consideration.

In this embodiment, the meanders 22 and 23 have shapes with left-right asymmetry with each other. As shown in FIG. 1, the meander 23 has three long-path portions 221, two short-path portions 223, and single middle-path portion 224. In addition, the meander 22 has four long-path portions 221, single long-path portion 222, and four short-path portions 223. In addition, the long-path portion 222 of the meander 22 is connected to the end portion 213 of the loop portion 21, and a part of the loop portion 21 is formed to have a shape that serves as a part of the meander 23.

The positional relationship between the dipole antenna 20 and the tear off line 11 having the above-described configurations will be described below.

In the RFID label 100 shown in FIG. 1, the width W3 of the long-path portion 222 is wider than the widths W2, W4, and W5 of the other parts of the dipole antenna 20. The tear off line 11 is formed so as to be superimposed with the long-path portion 222 of the meander 22 that is formed so as to be wider than the long-path portions 221, the short-path portions 223, and the middle-path portion 224.

Effects of First Embodiment

Figure 8:
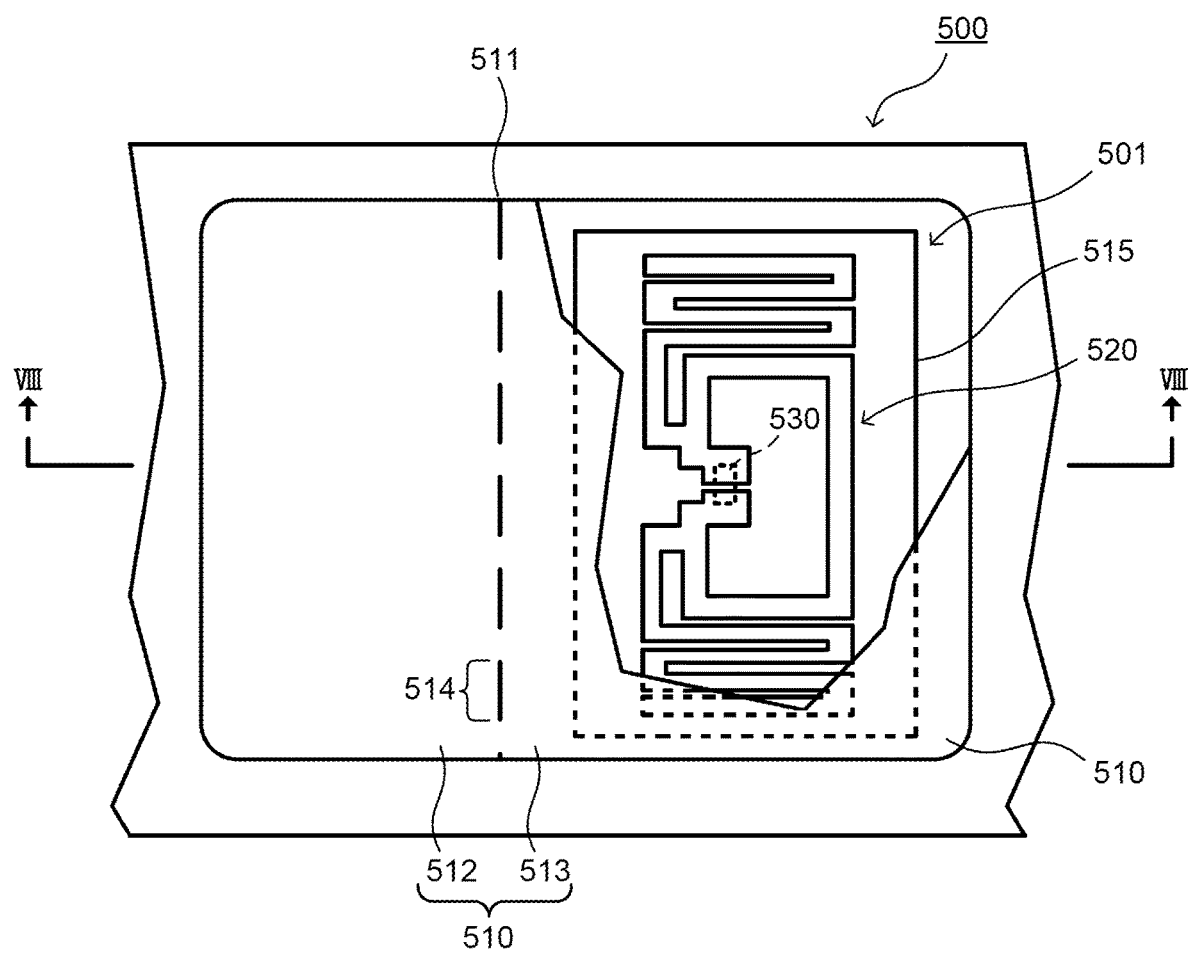
FIG. 8 is a schematic plan view showing the RFID label in a comparative example with a part thereof cut out.
Figure 9:
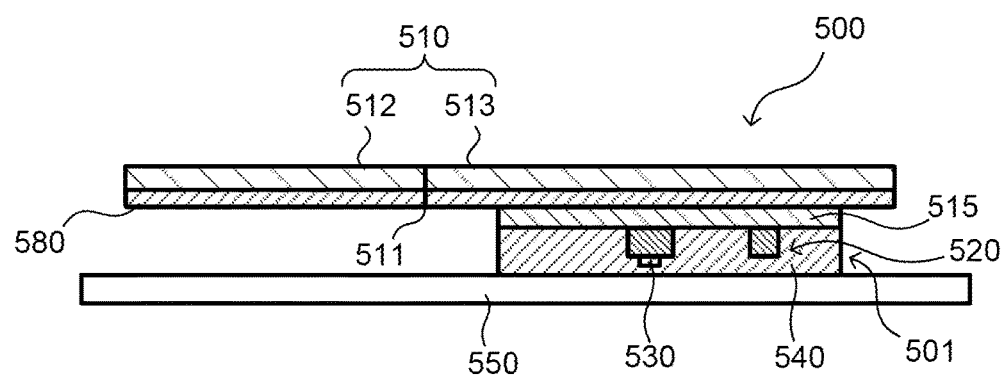
FIG. 9 is a sectional view taken along a line VIII-VIII shown in the RFID label in the comparative example.

Before explaining effects of the first embodiment, an RFID label 500 that is an example of the RFID label of a comparative example will be described with reference to FIGS. 8 and 9. FIG. 8 is a schematic plan view showing the RFID label 500 of the comparative example with a part thereof cut out, and FIG. 9 is a sectional view taken along a line VIII-VIII shown in the RFID label 500 of the comparative example.

The RFID label 500 serving as the comparative example is the RFID label a part of which is separable by a tear off line 511. The RFID label 500 is provided with a substrate 510 that can be separated into a first substrate portion 512 and a second substrate portion 513 by the tear off line 511 and an RFID inlay 501 that is overlaid on the substrate 510 via an adhesive agent 580. The RFID inlay 501 has a substrate 515, and a dipole antenna 520 and an IC chip 530 that are overlaid on the substrate 515. In addition, the RFID label 500 is provided with the RFID inlay 501, an adhesive agent 540 overlaid on a surface of the RFID inlay 501, and a separator 550 that is temporarily adhered to the adhesive agent 540.

With the RFID label 500 of the comparative example, because lengths of cut portions 514 of the tear off line 511 are longer than the antenna width of the dipole antenna 520, if the tear off line 511 is formed so as to intersect with the dipole antenna 20, there is a risk in that the dipole antenna 20 is completely cut off.

In addition, if a resin such as polyethylene terephthalate, etc., is used as the substrate 515 of the RFID inlay 501, because the resin has a high strength, it is difficult to cut uncut portions even if the tear off line 511 is formed, and therefore, the RFID inlay 501 is unsuitable for such an application requiring separation.

Thus, as shown in FIG. 8, in the RFID label 500, the RFID inlay 501 is arranged only on the second substrate portion 513 side of the substrate 510 so as to avoid the tear off line 511. Therefore, the size of the dipole antenna 520 is small and have a short communication range.

In contrast, with the RFID label 100 according to the first embodiment, because the tear off line 11 cuts through the substrate 10 and the dipole antenna 20 at a part of the dipole antenna 20 so as to extend along the antenna length direction and so as to be superimposed with the part of the dipole antenna 20, the conduction of the dipole antenna 20 is maintained. Therefore, the RFID label 100 can maintain the antenna performance even if the tear off line 11 is formed so as to be superimposed with the dipole antenna 20.

In addition, because electrical resistance is increased inversely proportional to the cross-sectional area, as the cross-sectional area is reduced, the antenna performance may be deteriorated. In contrast, in this embodiment, because the cut portions 111 of the tear off line 11 are formed so as to extend along the long-path portion 222 and so as to overlaid with the long-path portion 222, an increase in the electrical resistance is prevented, and a predetermined cross-sectional area is ensured. Thus, the RFID label 100 can maintain the antenna performance even if the dipole antenna 20 and the tear off line 11 are superimposed with each other.

In this embodiment, because the tear off line 11 is formed as described above, even if the dipole antenna 20 is arranged so as to spread over both sides of the tear off line 11, an electrical disconnection is prevented. Therefore, the large-sized antenna can be employed by utilizing a whole surface of the RFID label 100.

In addition, in this embodiment, as shown in FIG. 2, because the tear off line 11 is formed along the dipole antenna 20, the substrate 10 is reinforced with the dipole antenna 20 formed of the metal foil. Therefore, for example, when the RFID label 100 is handled, even if the RFID label 100 is separated to an intermediate position of the tear off line 11 unexpectedly, it is possible to prevent complete separation of the part of the RFID label 100 (the first substrate portion 12 or the second substrate portion 13) due to advancement of the separation and it is possible to prevent loss of a separated part.

When the RFID label 100 is used, it is possible to make either of the first substrate portion 12 or the second substrate portion 13 separable and use it as "a stub" for the user, for example. When the RFID label 100 is used in this manner, it suffices that the adhesiveness is eliminated by printing or applying a medium, a varnish, and so forth on a surface of the adhesive agent 40 on the portion to be used as the stub.

Second Embodiment

An RFID tag 200 according to a second embodiment of the present invention will be described. In each of the embodiments shown below, differences from the first embodiment will be mainly described, and components that have similar functions are assigned the same reference numerals and detailed descriptions thereof will be omitted.

Figure 3:
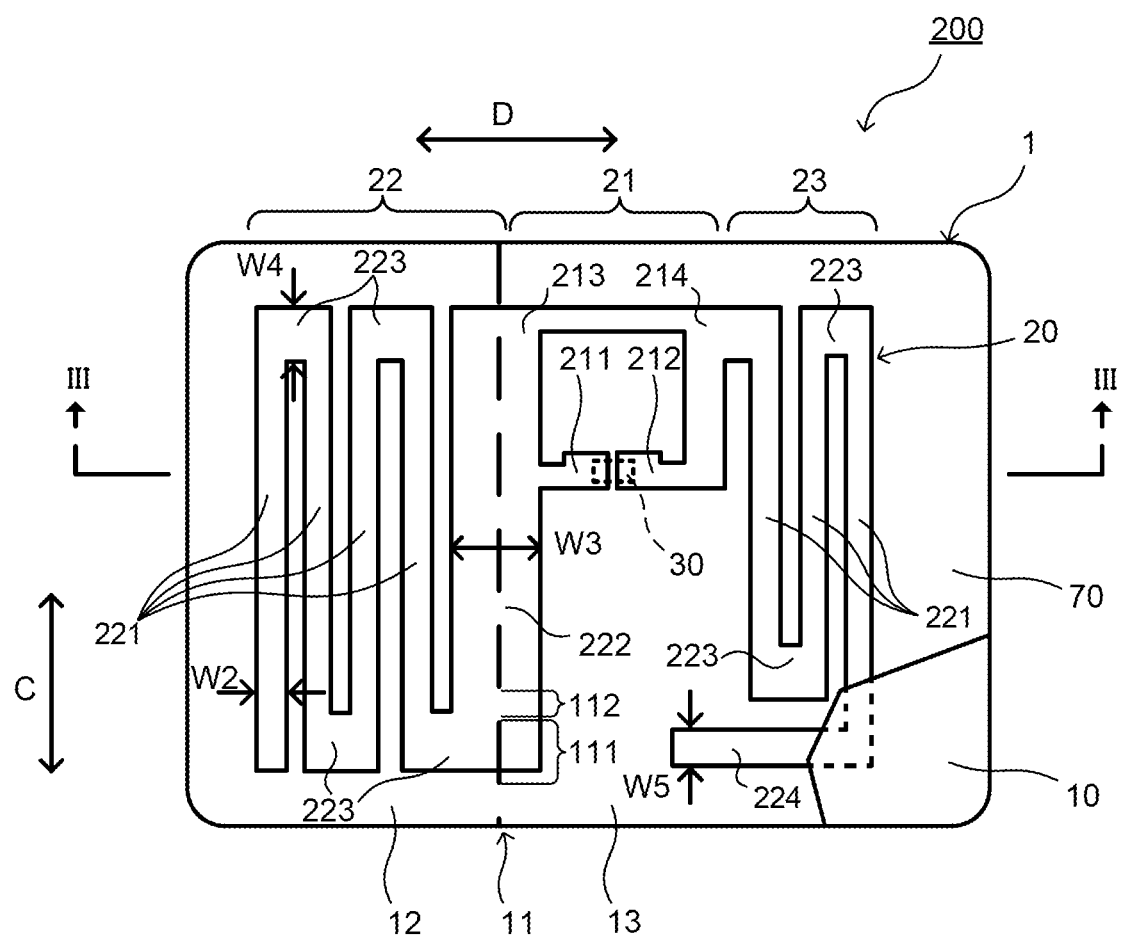
FIG. 3 is a schematic plan view showing an RFID tag according to a second embodiment of the present invention with a part thereof cut out.
Figure 4:
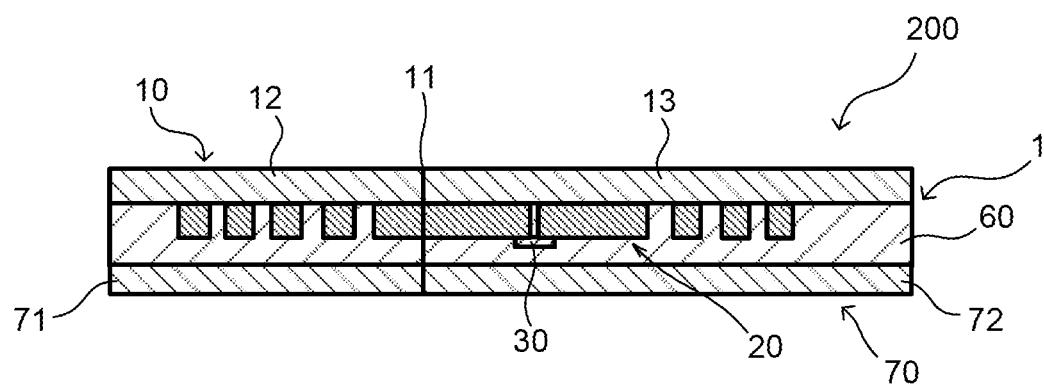
FIG. 4 is a sectional view taken along a line III-III shown in the RFID tag according to the second embodiment of the present invention.

FIG. 3 is a schematic plan view showing the RFID tag 200 according to the second embodiment with a part thereof cut out, and FIG. 4 is a sectional view taken along a line III-III shown in the RFID tag 200 according to the second embodiment of the present invention.

The RFID tag 200 is provided with the substrate 10 that can be separated into the first substrate portion 12 and the second substrate portion 13 by the tear off line 11, the dipole antenna 20 that is formed of a metal foil so as to have a predetermined antenna length and a predetermined antenna width, the dipole antenna 20 being arranged so as to spread over both sides of the tear off line 11 on the substrate 10, the IC chip 30 connected to the dipole antenna 20, a bonding agent (or adhesive agent) 60 that is overlaid on a surface on which the substrate 10, the dipole antenna 20, and the IC chip 30 are arranged, and a support substrate 70 that is overlaid via the bonding agent 60.

As shown in FIG. 4, in order to bond the support substrate 70, which will be described below, to the substrate 10, on which the dipole antenna 20 and the IC chip 30 are overlaid, the bonding agent 60 is overlaid on the surface of the substrate 10, on which the dipole antenna 20 and the IC chip 30 are arranged.

In this embodiment, as the bonding agent 60, in general, it is possible to use those that can be used to overlay the substrates. In addition, instead of using the bonding agent 60, the adhesive agent may also be used. The adhesive agent that can be used in this case includes the adhesive agents such as acrylic adhesive agents, urethane adhesive agents, silicone adhesive agents, rubber adhesive agents, and so forth.

The support substrate 70 can be separated into a first substrate portion 71 and a second substrate portion 72 at the tear off line 11 as the boundary.

In this embodiment, a material that can be applied as the support substrate 70 includes papers such as fine quality paper, coated paper, and so forth. The thickness of the support substrate 70 is preferably from 25 μm to 350 μm, inclusive, and generally, it is desirably from 50 μm to 260 μm, inclusive.

In this embodiment, the tear off line 11 cuts through all layers of the RFID tag 200 at the part of the dipole antenna 20 having the wide width so as to extend along the antenna length direction and so as to be superimposed with the part of the dipole antenna 20.

As shown in FIGS. 3 and 4, the tear off line 11 cuts through the all layers of the RFID tag 200 at the position that extends along the long-path portion 222 of the meander 22 extending along the meandering width direction C and that is superimposed with the long-path portion 222. In addition, the width W3 of the long-path portion 222 described above is wider than the widths W2, W4, and W5 of the other parts of the dipole antenna 20.

Effects of Second Embodiment

In the RFID tag 200 according to the second embodiment, the dipole antenna 20 has a wide-width part that is formed to have the wide antenna width, and the tear off line 11 is formed so as to extend along the antenna length direction at the wide-width part and so as to be superimposed with the wide-width part. Thus, the conduction of the dipole antenna 20 is maintained. Therefore, the RFID tag 200 can maintain the antenna performance even if the tear off line 11 is formed so as to be superimposed with the dipole antenna 20.

In addition, with the RFID tag 200, even at a part at which the dipole antenna 20 is superimposed with the tear off line 11, a predetermined cross-sectional area is ensured. Thus, the RFID tag 200 can maintain the antenna performance even if the tear off line 11 is superimposed.

In addition, the RFID tag 200 can be used by being attached to an apparel product, etc. with a string or a tag pin.

Third Embodiment

An RFID tag 300 according to a third embodiment of the present invention will be described. In each of the embodiments shown below, differences between the first embodiment and the second embodiment will be mainly described, and components that have similar functions are assigned the same reference numerals and detailed descriptions thereof will be omitted.

In the third embodiment, a holding substrate 90 that holds the substrate 10 is overlaid on a surface of the RFID tag 300 (a surface of the substrate 10 on which the dipole antenna 20 is not overlaid).

Figure 5:
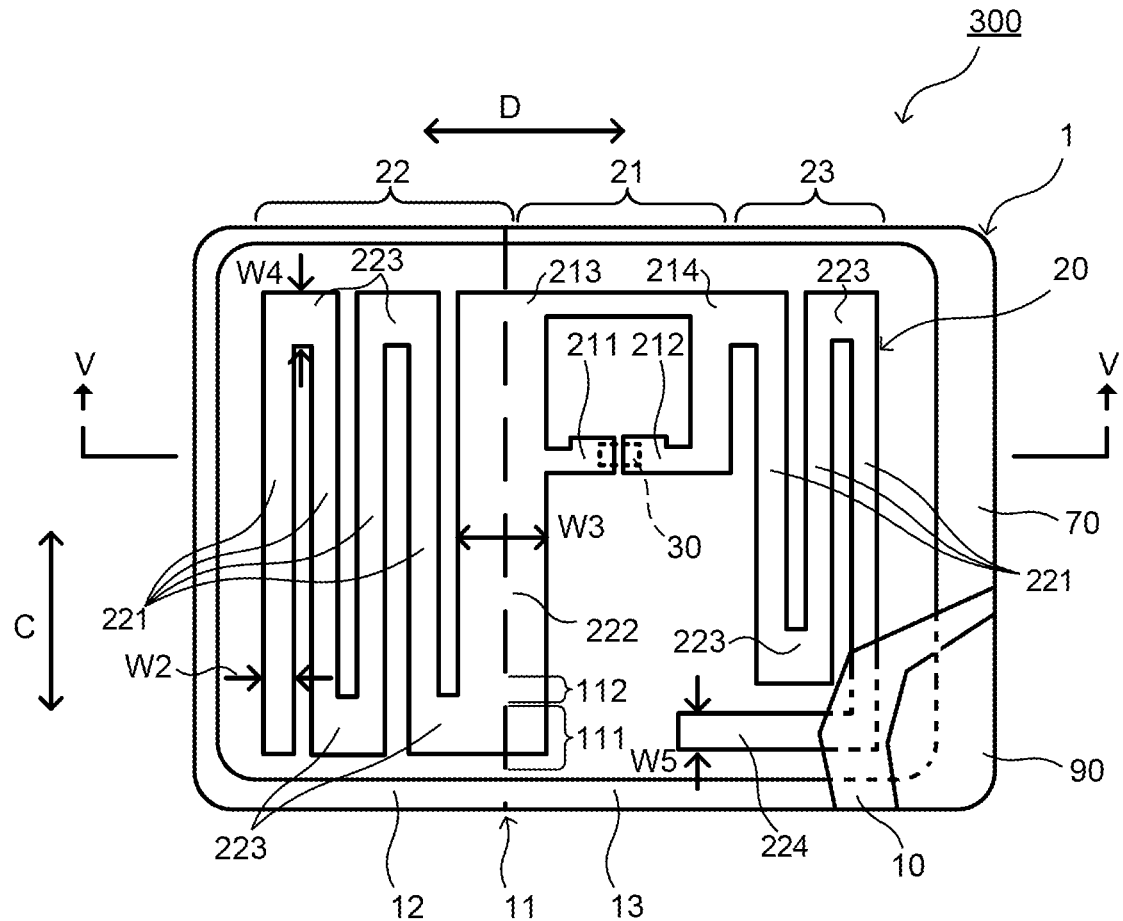
FIG. 5 is a schematic plan view showing the RFID tag according to a third embodiment of the present invention with the part thereof cut out.
Figure 6:
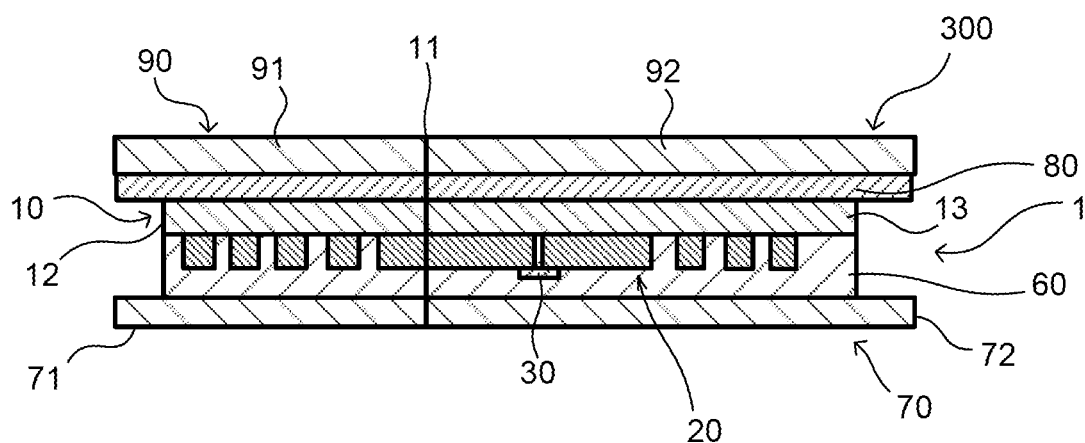
FIG. 6 is a sectional view taken along a line V-V shown in the RFID tag according to the third embodiment of the present invention.

FIG. 5 is a schematic plan view showing the RFID tag 300 according to the third embodiment with a part thereof cut out, and FIG. 6 is a sectional view taken along a line V-V shown in the RFID tag 300 according to the third embodiment of the present invention.

As shown in FIG. 6, in the RFID tag 300, the holding substrate 90 is overlaid on the surface of the substrate 10 via a bonding agent or adhesive agent 80. The holding substrate 90 holds the substrate 10.

In this embodiment, as the bonding agent or adhesive agent 80, in general, it is possible to use those that can be used to overlay the substrates.

The holding substrate 90 can be separated into a first substrate portion 91 and a second substrate portion 92 at the tear off line 11 as the boundary. In FIG. 6, although it is illustrated that there is a gap between an outer edge of the holding substrate 90 and an outer edge of the support substrate 70, in practice, the outer edge of the holding substrate 90 and the outer edge of the support substrate 70 are bonded together with the bonding agent or adhesive agent 80.

In this embodiment, as the holding substrate 90, papers such as the coated paper, etc., or a film formed of polypropylene, and polyethylene terephthalate may be used.

In this embodiment, the tear off line 11 cuts through all layers of the RFID tag 300 at the part of the dipole antenna 20 having the wide width so as to extend along in the antenna length direction and so as to be superimposed with the part of the dipole antenna 20.

As shown in FIGS. 5 and 6, the tear off line 11 cuts through all layers of the RFID tag 300
at the position that extends along the long-path portion 222 of the meander 22 extending along the meandering width direction C and that is superimposed with the long-path portion 222. In addition, the width W3 of the above-described long-path portion 222 is wider than the widths W2, W4, and W5 of the other parts of the dipole antenna 20.

Effects of Third Embodiment

In the RFID tag 300 according to the third embodiment, the dipole antenna 20 has the wide-width part that is formed to have the wide antenna width, and the tear off line 11 is formed so as to extend along the antenna length direction in the wide-width part and so as to be superimposed with the wide-width part. Thus, the conduction of the dipole antenna 20 is maintained. Therefore, the RFID tag 300 can maintain the antenna performance even if the tear off line 11 is formed so as to be superimposed with the dipole antenna 20.

In addition, with the RFID tag 300, even at the superimposed part between the dipole antenna 20 and the tear off line 11, a predetermined cross-sectional area is ensured. Thus, the RFID tag 200 can maintain the antenna performance even if the tear off line 11 is superimposed with the dipole antenna 20.

In addition, with the RFID tag 300 according to the third embodiment, because the holding substrate 90 is overlaid on a back surface of the substrate 10 via the bonding agent or adhesive agent 80, a strength against an external impact, such as bending, etc., is improved, and at the same time, it is possible to provide an aesthetic/luxury appearance.

In addition, in the RFID tag 300 according to the third embodiment, the RFID inlay 1 may be overlaid such that the front surface and the back surface of the RFID inlay 1 are inverted and the IC chip 30 is arranged on the side of the holding substrate 90.

<Modification of Antenna Pattern>

In the first embodiment to the third embodiment, a description has been given of an example in which a part of the loop portion 21 is formed to have the shape that serves as a part of the meander 23 in the dipole antenna 20 and the long-path portion 222 is formed in this part so as to have the widths wider than those of the other long-path portions 221. However, the shape of the dipole antenna 20 is not limited to those shown in FIGS. 1 to 6.

Figure 7:
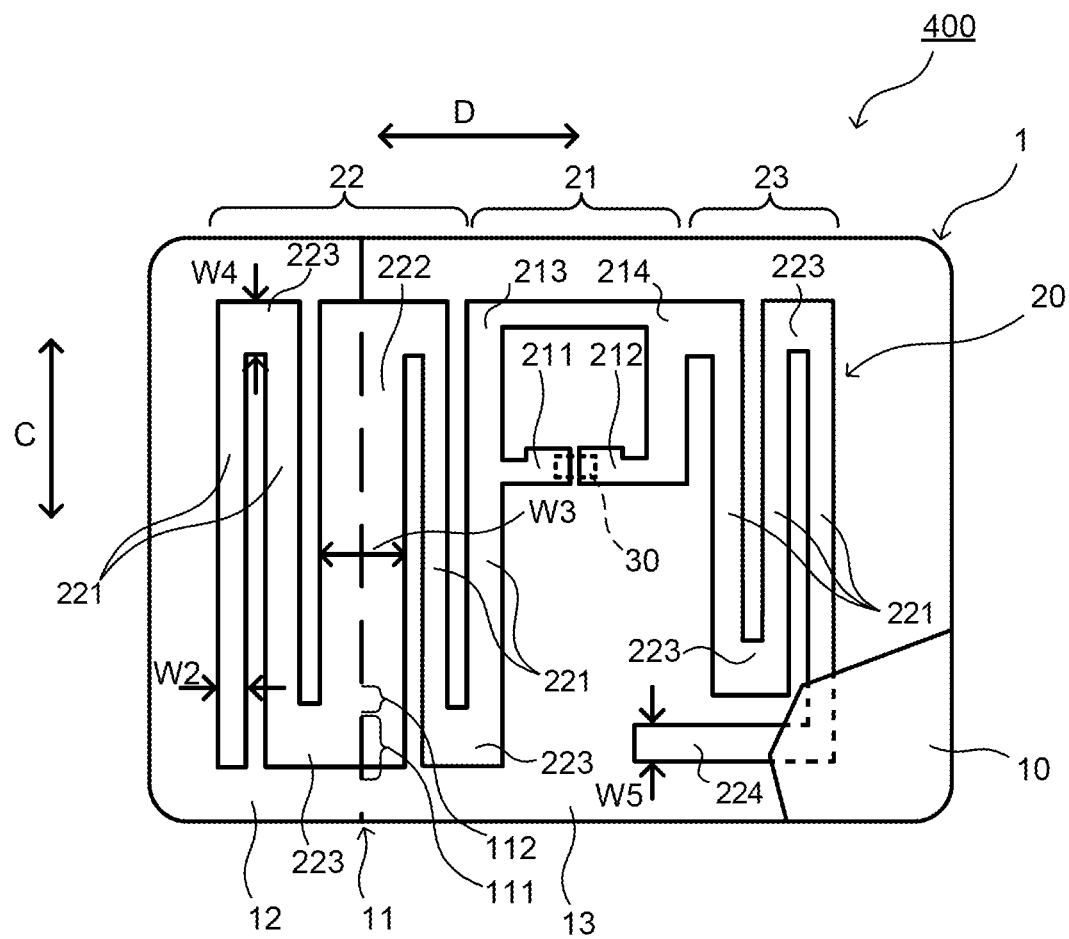
FIG. 7 is a schematic plan view showing the RFID tag provided with a dipole antenna as a modification with a part thereof cut out.

FIG. 7 is a schematic plan view showing an RFID tag 400 provided with the dipole antenna 20 as a modification with a part thereof cut out.

In the dipole antenna 20, the long-path portion 222 having the wide width may be formed so as to correspond to the position where the tear off line 11 is to be provided. For example, there is a case in which the area of the first substrate portion 12 of the RFID label 100 according to the first embodiment may be narrower than the embodiment shown in FIG. 1. In such a case, the long-path portion 222 may be moved to the position shown in FIG. 7 from the position shown in FIG. 1.

As described above, the ratio between the area of the first substrate portion 12 and the area of the second substrate portion 13 in the substrate 10 may be changed in accordance with application embodiments of the label and the tag.

The same applies for the RFID tag 200 of the second embodiment and the RFID tag 300 of the third embodiment.

For the meanders 22 and 23 of the dipole antenna 20 shown in these embodiments, the number of meandering, the meandering shape, and so forth may be appropriately changed, and they are not limited to those shown in the figures.

In addition, the width W2 of the long-path portions 221, the width W4 of the short-path portions 223, and the width W5 of the middle-path portion 224 shown in this embodiment may be appropriately changed, and they are not limited to those shown in the figures. The width W3 of the long-path portion 222 may also be changed appropriately as long as the width W3 is wider than the tear off line 11 and the antenna performance can be maintained.

Other Embodiments

Although the embodiments of the present invention have been described in the above, the above-mentioned embodiments merely illustrate a part of application examples of the present invention, and the technical scope of the present invention is not intended to be limited to the specific configurations of the above-described embodiments.

In this embodiment, as shown in FIGS. 1 to 7, although the meanders 22 and 23 have shapes with left-right asymmetry with each other, the meanders 22 and 23 may have the shapes with left-right symmetry.

In addition, in this embodiment, in the dipole antenna 20, although the part of the loop portion 21 and the part of the meander 23 are formed integrally, the loop portion 21 and the meander 23 may not be formed integrally. For example, the meanders 22 and 23 may be formed to have the left-right symmetrical shape.

In the RFID tag 300 according to the third embodiment, the RFID label may have a configuration in which the adhesive agent is used instead of the bonding agent 60 and a separator is used instead of the support substrate 70. In this case, the RFID inlay 1 may be overlaid such that the front surface and the back surface of the RFID inlay 1 are inverted and the IC chip 30 is arranged on the side of the holding substrate 90.

The RFID tag 200, the RFID tag 300, and the RFID tag 400 may be formed with a through hole such as a tag hole, etc. for passing a string or a cord therethrough at a position that does not interfere with the dipole antenna 20 or the IC chip 30 in order to attach the RFID tag 200, the RFID tag 300, and the RFID tag 400 to a target object such as the product item, etc.

The present application claims a priority based on Japanese Patent Application No. 2018-248103 filed on Dec. 28, 2018 in the Japan Patent Office, the entire contents of which are incorporated herein by reference.

The invention claimed is:

1. An RFID label having a part separable by a tear off line, the RFID label comprising:
   a substrate;
   a dipole antenna formed of a metal foil so as to have a predetermined antenna length and a predetermined antenna width, the dipole antenna being arranged on a surface of the substrate; and
   an IC chip connected to the dipole antenna, wherein
   the dipole antenna is provided with:
      an IC-chip connecting portion to which the IC chip is connected;
      a loop portion having the IC-chip connecting portion;
      a meander extending from the loop portion in a direction intersecting with a direction in which the tear off line extends; and
      a part formed to have an antenna width wider than a width of other parts of the dipole antenna, said part extending along the direction in which the tear off line extends, and
   the tear off line extends through the substrate and the dipole antenna so as to extend along and through said part of the dipole antenna.

2. The RFID label according to claim 1, wherein
   a holding substrate configured to hold the substrate is overlaid on a back surface of the substrate.

3. An RFID tag having a part separable by a tear off line, the RFID tag comprising:
   a substrate;
   a dipole antenna formed of a metal foil so as to have a predetermined antenna length and a predetermined antenna width, the dipole antenna being arranged on a surface of the substrate; and
   an IC chip connected to the dipole antenna, wherein
   the dipole antenna is provided with:

an IC-chip connecting portion to which the IC chip is connected;

a loop portion having the IC-chip connecting portion;

a meander extending from the loop portion in a direction intersecting with a direction in which the tear off line extends; and a part formed to have an antenna width wider than a width of other parts of the dipole antenna, said part extending along the direction in which the tear off line extends, and the tear off line extends through the substrate and the dipole antenna so as to extend along and through said part of the dipole antenna.

4. The RFID tag according to claim 3, wherein a holding substrate configured to hold the substrate is overlaid on a back surface of the substrate.

* * * * *